No. 873,589. PATENTED DEC. 10, 1907.
A. C. PARRY.
GRIDIRON.
APPLICATION FILED NOV. 20, 1906.
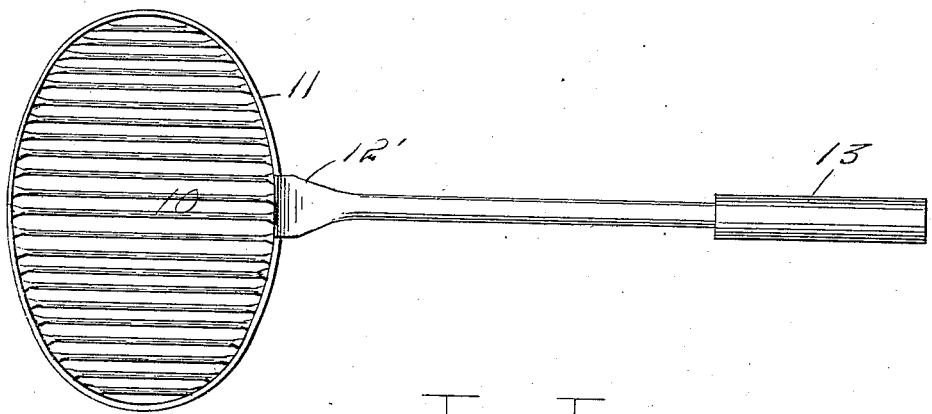
Fig. I.
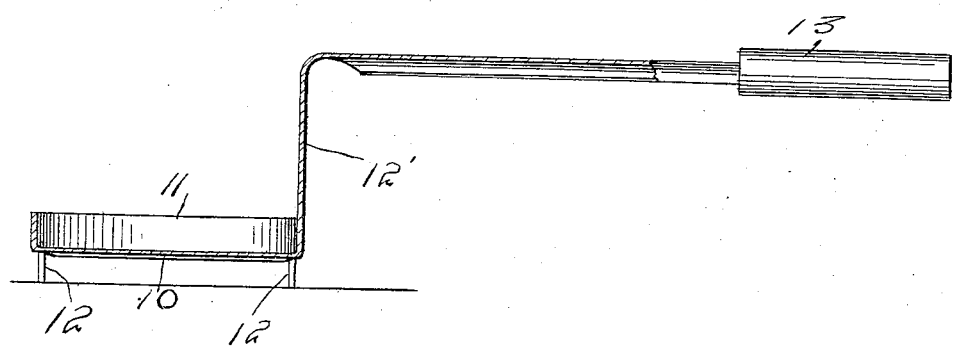
Fig. 2.
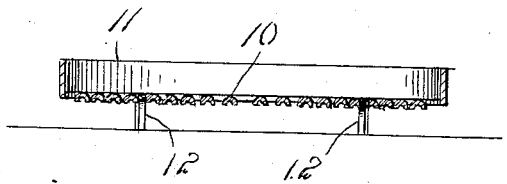
Fig. 3.
Witnesses
Inventor
Anna C. Parry,
By
Attorneys

UNITED STATES PATENT OFFICE.

ANNA C. PARRY, OF WYNCOTE, PENNSYLVANIA.

GRIDIRON.

No. 873,589.     Specification of Letters Patent.     Patented Dec. 10, 1907.

Application filed November 20, 1906. Serial No. 344,287.

*To all whom it may concern:*

Be it known that I, ANNA C. PARRY, a citizen of United States, residing at Wyncote, in the county of Montgomery, State of Pennsylvania, have invented certain new and useful Improvements in Gridirons; and I do hereby declare the following to be a full, clear, and exact description of the invention, such as will enable others skilled in the art to which it appertains to make and use the same.

This invention has relation to that class of cooking utensils commonly called "broilers" for broiling meats, toasting bread, etc., and it has for its object the provision of improvements that will enhance the serviceability of the broiler and render it less annoying in use.

The nature of the invention consists of a broiler made from sheet metal and having rounded bars, an upstanding rim around its outer edge, legs to support it on the coals, and a metal strip extending vertically from the broiler and then horizontally and provided on its end with a wooden handle to take hold of by the hand of the user.

The invention is shown as embodied in the broiler portrayed in the annexed drawings, forming a part of this specification, in view of which it will first be described in detail and then pointed out in the claims.

Of the drawings,—Figure 1 is a plan of the invention. Fig. 2 is a side view partly in section. Fig. 3 is a transverse section through the body of the utensil.

Similar numerals of reference designate the same parts or features, as the case may be, wherever they occur.

In the drawings, 10 designates the grid of the broiler, which is composed of rounded bars of sheet steel or other metal, integrally connected at their ends with an upstanding rim 11. The broiler is provided at suitable points with feet 12 to enable it to stand upon the coals of the fire while the meat or other article of food on the grid is being cooked, if it is desired to use it in this way.

From the edge of the rim 11 at one side thereof there extends a metal strip 12' that is bent to stand vertically to a height of about eight inches and it is then bent horizontally to form a handle-bar, and provided on its end with a wooden handle 13. The handle-bar 12' may be integral with the grid and its rim or it may be made separately and secured thereto. When made integral with the broiler proper the strip 12' may be bent to rounded form in cross section to increase its rigidity and strength. The upstanding rim 11 is provided for the purpose of keeping steaks, chops, bread or other articles on the grid from sliding off into the fire. The bars of the grid might be made flat or but partially rounded in cross section, but in any case their bearing on the meat or other matter on the grid should be narrow, in order that they may not prevent the cooking of the food on the broiler by the direct heat from the coals.

By forming a broiler in the manner described it is not only made highly serviceable, but it is rendered easy and ready of manufacture, so that it can be produced at the minimum of expense, thus placing it where it may become of universal use where cooking by broiling or toasting or the like is done.

What is claimed is:—

A grid-iron comprising half-rounded sheet-iron bars, an upstanding rim integrally connected with the bars, legs for supporting the grid-bars and rim integrally connected therewith, a metal strip integrally connected with the rim and extending first vertically therefrom and then turned in a horizontal plane, the horizontal portion being bent into half-rounded form, and provided on its end with a wooden handle.

In testimony whereof, I affix my signature, in presence of two witnesses.

ANNA C. PARRY.

Witnesses:
   CLARISSA GOODWIN,
   MARY W. MATHER.